United States Patent
Robichaux et al.

(10) Patent No.: US 11,024,189 B2
(45) Date of Patent: Jun. 1, 2021

(54) VIRTUAL COACHING PLATFORM

(71) Applicant: BetterUp, Inc., San Francisco, CA (US)

(72) Inventors: Alexi Robichaux, San Francisco, CA (US); Eduardo Medina, San Francisco, CA (US); Ryan Sonnek, New Hope, MN (US)

(73) Assignee: BetterUp, Inc., San Francisco, CA (US)

( * ) Notice: Subject to any disclaimer, the term of this patent is extended or adjusted under 35 U.S.C. 154(b) by 204 days.

(21) Appl. No.: 15/853,535

(22) Filed: Dec. 22, 2017

(65) Prior Publication Data

US 2018/0190135 A1 Jul. 5, 2018

Related U.S. Application Data

(60) Provisional application No. 62/438,889, filed on Dec. 23, 2016.

(51) Int. Cl.
*G09B 5/06* (2006.01)
*G09B 7/02* (2006.01)
*G09B 5/12* (2006.01)

(52) U.S. Cl.
CPC ............... *G09B 5/06* (2013.01); *G09B 5/125* (2013.01); *G09B 7/02* (2013.01)

(58) Field of Classification Search
CPC ............ G09B 5/06; G09B 5/125; G09B 7/02
See application file for complete search history.

(56) References Cited

U.S. PATENT DOCUMENTS

| | | | | |
|---|---|---|---|---|
| 2003/0028498 A1* | 2/2003 | Hayes-Roth | ............ | G06N 20/00 706/17 |
| 2005/0228762 A1* | 10/2005 | D'Elena | ................. | G06Q 10/10 706/1 |
| 2006/0154226 A1* | 7/2006 | Maxfield | .................. | G09B 7/00 434/323 |
| 2011/0117534 A1* | 5/2011 | Berger | ..................... | G09B 5/08 434/350 |
| 2013/0101975 A1* | 4/2013 | Hardy | ....................... | G09B 5/00 434/362 |
| 2017/0116870 A1* | 4/2017 | Brem | ......................... | G09B 5/04 |
| 2019/0228365 A1* | 7/2019 | Kamath | .................. | G06N 20/00 |
| 2019/0308317 A1* | 10/2019 | Noda | ...................... | G05B 13/02 |

* cited by examiner

*Primary Examiner* — Corbett B Coburn
(74) *Attorney, Agent, or Firm* — Kwan & Olynick LLP

(57) ABSTRACT

Some embodiments of a virtual coaching platform can analyze user and coach characteristics to determine suggested coaching partnerships. Some virtual coaching platform embodiments can implement whole-person dimensionalities used to track progress and provide coaching resources and guidance. In some implementations, the virtual coaching platform can provide six whole-person dimensions including: centered, aware, agile, includes, elevates, and drives. Some virtual coaching platform embodiments can select a subset of the dimensionalities to update using determined associations between a user and the dimensionalities. Some virtual coaching platform embodiments can implement a motivational matrix to assess a user in a readiness versus clarity domain and provide coaching suggestions based on a corresponding type.

20 Claims, 16 Drawing Sheets

Your Whole Person Snapshot

May 1, 2017

About This Report

Start your coaching journey off on the right foot!

Your Whole Person Snapshot Report is a starting point in increasing your self-awareness and to begin your work with your coach. Calculated from your responses on the Whole Person Assessment, this report provides insight into your baseline level on each of the 25 Whole Person Skills, concepts backed by strong research evidence to supporting personal Thriving and Inspiring others. This valuable tool is step one on a successful coaching journey.

Step 1

Chart Your Starting Point

Use this report to gain insight into your current level on earth of the 25 Whole Person Skills.

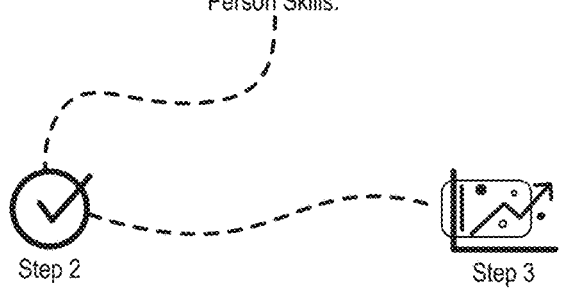

Step 2
Scope Out Your Goals
Your coach will guide you in interpreting your report as a lens for identifying both your strengths and potential blockers to aid in setting your goals Step 3
Create an Action Plan
The Whole Person Snapshot is a forward-thinking tool, intended to help you orient your development today so you can drive your potential tomorrow.

*Now let's dive into your results!*

*FIG. 8C1*

Your Whole Person Strengths

These are your starting top 5 Whole Person Skills, measured before coaching.*

1. Mindfulness — 57/60
— Thriving as a Person

You have the ability to focus in and notice what's going on in the present moment. Instead of dwelling in the past, or worrying too much about the future, you tune into to what's happening right now – making you more perceptive, engaged and balanced. Those strong in Mindfulness often have:
- An empathetic approach to helping others through tough situations
- Skills to reframe stressful situations into manageable challenges
- Think clearly and calmly, even under pressure

2. Growth Mindset — 56/60
— Thriving as a Person

You believe that if you put in the time and effort, you can develop the skills you need to succeed. People with a growth mindset tend to achieve more than those with a Fixed Mindset, because they put more into learning. Those with growth mindset:
- Believe abilities are developable and not something you are born with
- See challenges as opportunities for growth
- Learn from feedback

3. Engagement — 54/60
— Thriving as a Person

You are immersed in your work. You find your work stimulating, which keeps you focused and allows you to sustain performance over the long-haul. Highly engaged individuals tend to:
- Bring a strong personal energy to their role
- Have a strong connection to and are highly motivated by their work
- Have high levels of self-esteem, productivity and job satisfaction

4. Participation — 53/60
— Thriving as a Leader

You are skilled at encouraging participation to make sure all voices are heard. This creates a culture of openness and lets ideas shine through from all team members. More ideas mean better ideas and better team performance. You might be known in your organization to:
- Involve individuals in decisions that impact them
- Make sure others feel comfortable participating in discussions
- Encourage everyone to share their ideas

5. Flow — 52/60
— Thriving as a Person

You have the ability to get "in the zone" at work. Balancing your skills with the challenges you take on allows you to become fully immersed in your work, be creative, and love what you do. Those with a flow as a strength:
- Can focus for long periods of time on a single project
- Might lose track of time when they're particularly absorbed
- Enjoy periods of uninterrupted work

*Tip: Consider how you use your strengths. Do you need to dial them up or do you over-rely on them? Discuss this in session with your coach.*

*FIG. 8C2*

*Reveal your full Whole Person Snapshot* ∧

| Rank | | Score |
|---|---|---|
| ⑥ | Alignment<br>— Inspiring as a Leader<br>Purpose is the belief that our work is important and that we are contributing to a mission that is personally meaningful. | 52 |
| ⑦ | Recognizing<br>— Inspiring as a Leader<br>Purpose is the belief that our work is important and that we are contributing to a mission that is personally meaningful. | 50 |
| ⑧ | Purpose<br>— Thriving as a Person<br>Purpose is the belief that our work is important and that we are contributing to a mission that is personally meaningful. | 49 |
| ⑨ | Influence<br>— Inspiring as a Leader<br>Purpose is the belief that our work is important and that we are contributing to a mission that is personally meaningful. | 49 |
| ⑩ | Values<br>— Thriving as a Person<br>Purpose is the belief that our work is important and that we are contributing to a mission that is personally meaningful. | 48 |
| ⑪ | Problem Solving<br>— Inspiring as a Leader<br>Purpose is the belief that our work is important and that we are contributing to a mission that is personally meaningful. | 46 |
| ⑫ | Energy<br>— Thriving as a Person<br>Purpose is the belief that our work is important and that we are contributing to a mission that is personally meaningful. | 45 |
| ⑬ | Open Communication<br>— Inspiring as a Leader<br>Purpose is the belief that our work is important and that we are contributing to a mission that is personally meaningful. | 45 |
| ⑭ | Emotional Regulation<br>— Thriving as a Person<br>Purpose is the belief that our work is important and that we are contributing to a mission that is personally meaningful. | 45 |
| ⑮ | Coaching<br>— Inspiring as a Leader<br>Purpose is the belief that our work is important and that we are contributing to a mission that is personally meaningful. | 44 |

| Rank | | Score |
|---|---|---|
| ⑯ | Calm<br>— Thriving as a Person<br>Purpose is the belief that our work is important and that we are contributing to a mission that is personally meaningful. | 43 |
| ⑰ | Feedback<br>— Inspiring as a Leader<br>Purpose is the belief that our work is important and that we are contributing to a mission that is personally meaningful. | 43 |
| ⑱ | Building Relationships<br>— Inspiring as a Leader<br>Purpose is the belief that our work is important and that we are contributing to a mission that is personally meaningful. | 42 |
| ⑲ | Resilience<br>— Thriving as a Person<br>Purpose is the belief that our work is important and that we are contributing to a mission that is personally meaningful. | 41 |
| ⑳ | Motivating<br>— Inspiring as a Leader<br>Purpose is the belief that our work is important and that we are contributing to a mission that is personally meaningful. | 40 |
| ㉑ | Sense of Control<br>— Thriving as a Person<br>Purpose is the belief that our work is important and that we are contributing to a mission that is personally meaningful. | 38 |
| ㉒ | Trust Climate<br>— Inspiring as a Leader<br>Purpose is the belief that our work is important and that we are contributing to a mission that is personally meaningful. | 34 |
| ㉓ | Focus<br>— Thriving as a Person<br>Purpose is the belief that our work is important and that we are contributing to a mission that is personally meaningful. | 32 |
| ㉔ | Encouraging Ownership<br>— Inspiring as a Leader<br>Purpose is the belief that our work is important and that we are contributing to a mission that is personally meaningful. | 29 |
| ㉕ | Risk Tolerance<br>— Thriving as a Person<br>Purpose is the belief that our work is important and that we are contributing to a mission that is personally meaningful. | 27 |

*FIG. 8C3*

Appendix

How to Interpret Your Whole Person Snapshot Report

Thriving as a Person

The psychological resources that help you learn, adapt, and connect with others.

Inspiring as a Leader

Leadership skills that have been shown to help you drive innovation, employee engagement, and business results.

Score

Scores are based on a 60 point scale, with 60 being the highest.

- 41-60: Strength
- 21-40: Medium ability
- 0-20: Potential development area

What is the origin of these 25 skills?

The concepts included in the Whole Person Model were derived from decades of academic research in the fields of organizational, developmental, and positive psychology. BetterUp's Science Board identified the top 25 concepts with the strongest research evidence for supporting personal Thriving and Inspiring others. We believe that everyone is a whole-person no matter where they score in these 25 areas. Rather, the term "whole person" is a reference to our belief that sustainable personal growth comes from changing your attitudes and beliefs, and not just your external behaviors.

Can I trust my results?

Self-reported assessments, when controlled through statistical tools for distorting incentives and properly validated items (i.e., questions), have been shown to be effective in a wide range of disciplines including health sciences and social sciences. It's important to take these results for what they are -- one additional perspective on your progress toward your goals. There are certainly factors outside of BetterUp that may impact your results and we encourage you to use them as a self-awareness tool to continue to strive for lasting positive changes in your life.

*Your Whole Person Skills will be measured periodically over the course of your BetterUp program through the Program Check-in.

*FIG. 8C4*

FIND
[High Readiness + Low Clarity]

| Recommended Interventions | Recommended Resources | Things to Avoid |
|---|---|---|
| Provide education on coaching and how it can be used to optimize one's performance, not simply to fix problem areas<br><br>Emphasize to the Member the importance of deep clarity and self-awareness before jumping into goal setting<br><br>Engage in values and strengths exploration exercises prior to goal identification or assigning resources tied to this Member's goals<br><br>Give this Member resources that are engaging (that matches their high readiness) but not too complex (to match their low clarity)<br><br>Once this Member has identified clear goals, give HW assignments that are focused on deepening self-awareness (e.g. if she/he has the goal of becoming a better leader, first have them explore what type of leader they are before assigning resources that are on general strategies for effective leadership)<br><br>Slowly scaffold HW assignments to be increasingly deeper and more complex to build out this Member's confidence and deepen their awareness | Education on Coaching:<br>• What Can Coaching Do For Your Leadership?<br>• What is coaching?<br>• Coaching for beginners<br><br>Values Work:<br>• Identify your values<br>• Values card sort exercise<br><br>Strengths Work:<br>• VIA Character Strengths Survey<br><br>Goal Clarity:<br>• Trying out WOOP<br><br>Awareness:<br>• How to crack the self-awareness puzzle<br>• 5 ways to become more self-aware | Jumping to make goals. If the Member isn't clear, these will turn into surface-level goals and engagement will eventually drop off<br><br>Waiting too long to open and explore the gap. This Member will want to dive in. The important part of this coaching interaction will be guiding this Member to take time to find clarity before action<br><br>Asking them powerful or complex questions that require a lot of self-awareness and/or clarity<br><br>The urge to give them advanced level resources early on. High readiness clients can be very enthusiastic and will want to be given a lot of resources. However, their low clarity often makes them think they are ready for more focused work than they are |

VIRTUAL COACHING PLATFORM

This application claims the benefit of U.S. Provisional Application No. 62/438,889, filed Dec. 23, 2016, entitled "SYSTEMS AND METHODS FOR VIRTUAL EXECUTIVE COACHING," which application is hereby incorporated by reference in its entirety.

BACKGROUND

People today face a culture of constant change, increasing complexity, and an expectation to be always-connected. These conditions have produced excessive stress and an unproductive, disengaged workforce. For example, 83% of American workers report being over stressed by their jobs while only 13% reports feeling engaged. Various factors have led to these conditions including a leadership gap as the "baby boom" generation retires while five distinct generations remain in the workforce; new mobile working styles and increased connectivity that promote an expectation that people are always available; and the workplace has more commonly become a place where workers expect to gain fulfillment and meaning.

These conditions of stress and disengagement can extend to people's private and professional lives. For example, when working within a varied team, participants may find it difficult to create a culture of inclusion and cooperation. New parents also face many challenges to balance new responsibilities while maintaining high performance. Workers in a remote workforce may find it difficult to cultivate behaviors that create culture across disparate locations. These are just a few of the innumerable circumstances where people struggle with developing the skills necessary to thrive.

While individuals and companies take steps to combat challenges such as stress and disengagement, they typically over-invest in formal training while failing to focus on experiential opportunities. Instead, people need personal support that focuses on experiences tailored to the individual. However, finding individual support is difficult and expensive. Furthermore, current coaching providers do not have the insight necessary into their coaches and customers to provide adequate support for the customers or coaching guidance for the coaches.

BRIEF DESCRIPTION OF THE DRAWINGS

FIGS. 8A-F are diagrams illustrating example user interfaces for implementing aspects of a virtual coaching platform.

The techniques introduced here may be better understood by referring to the following Detailed Description in conjunction with the accompanying drawings, in which like reference numerals indicate identical or functionally similar elements.

DETAILED DESCRIPTION

Figure 1:
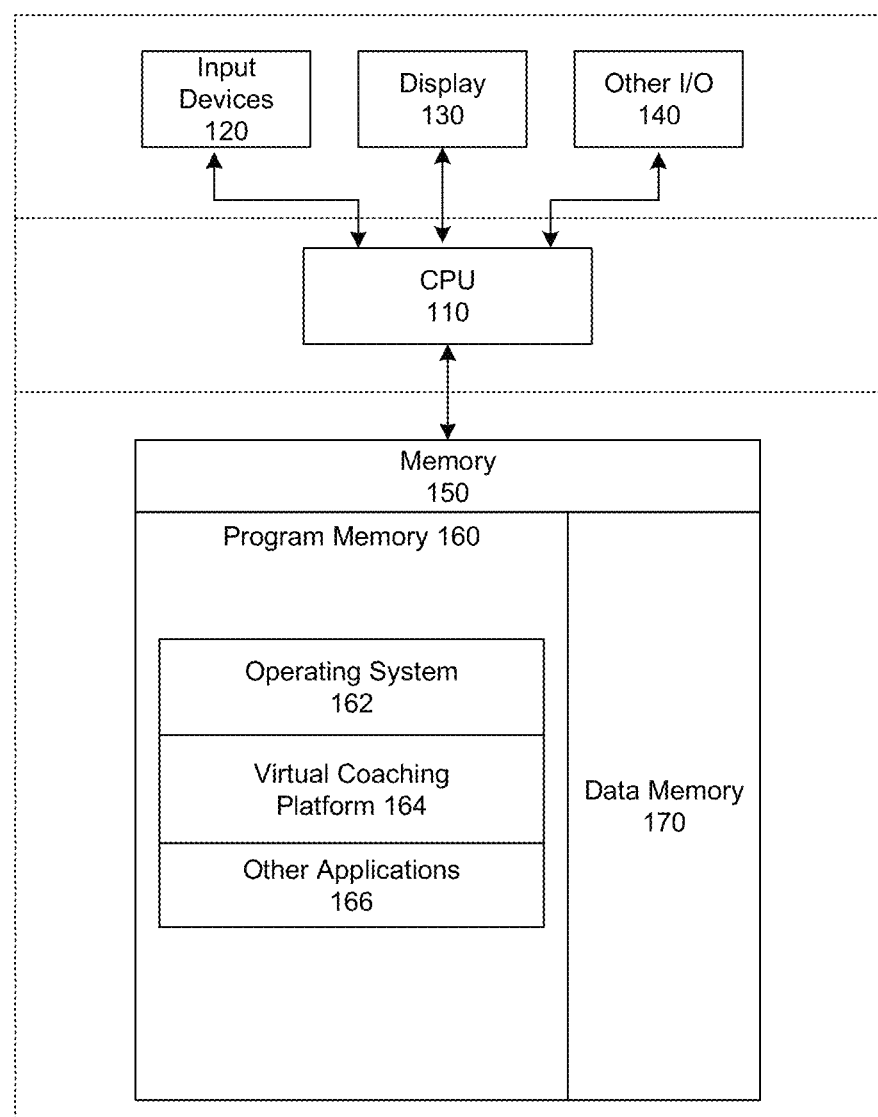
FIG. 1 is a block diagram illustrating an overview of devices on which some implementations can operate.

Embodiments for operating a virtual coaching platform are described. A virtual coaching platform can promote development in both personal and professional categories to develop "whole-person" skills. The virtual coaching platform can be useful to support role transitions, such as promotions or changes in focus, can help users achieve higher potentials, can boost team cohesion, can alleviate skill gaps that hamper collaboration and productivity, and can teach inclusion to promote diversity. The virtual coaching platform can be personalized to support different learning styles and provide accountability through human interaction. The virtual coaching platform can be available through multiple interface types to provide convenient and continuous, as opposed to episodic, support. This can integrate the coaching experience into everyday life, helping to build new behaviors. The virtual coaching platform can also provide results that are measurable using evidence-based processes and measures so that progress is tangible and can be evaluated.

Some of the virtual coaching platform embodiments include analyzing user and coach characteristics to determine suggested coaching partnerships. For example, coaching partnerships can be based on analysis of coaches and users styles (e.g., economy, accountability, directness, and explorative) and interests (e.g. improve focus; improve inspiration; improve stress management; increase team impact; become more open; communicate with more poise). Scores can be generated for the level of compatibility between a user's and coach's various styles and interests. Coaches can be suggested to users based on a combination of the scores, the coach's availability, and the coach's current coaching capacity. Additional details regarding analyzing users and coaches and suggesting coaching partnerships are provided below in relation to FIG. 4.

Some of the virtual platform coaching embodiments include implementations of a user skills model, referred to herein as a "whole-person model," used to track progress and provide coaching resources and guidance. In some implementations, the virtual coaching platform can utilize a whole-person model that provides six whole-person dimensions including: centered, aware, agile, includes, elevates, and drives. In some implementations, these dimensions can each be further described in terms of multiple sub-dimensions. In some implementations, these dimensions can be grouped into categories such as personal or leadership. The dimensions and sub-dimensions that a whole-person model can be divided into are together referred to herein as the "dimensionalities" of the whole-person model. Additional details regarding example whole-person dimensions are provided below in relation to Table 2.

In some implementations, scores can be generated in each dimension, sub-dimensions, category, or any combination thereof. Sub-dimensions scores can be generated by determining a user score in each sub-dimension, comparing the user sub-dimension score to a base score, as a percentile, and converting the percentile into a sub-dimensions score.

Dimension scores can be generated in a similar manner where the user dimension base score is determined through a combination of the sub-dimension user base scores. Dimensionality scores can be provided in a whole-person report as a benchmarking tool and can be used to select resources and next steps in coaching based on score mappings. Additional details regarding generating and using whole-person dimensionality scores are provided below in relation to FIG. 5.

One or more of these dimensionality scores can be updated, e.g., periodically, where the category selected to be updated can be individually selected using associations between the user and various tags corresponding to the dimensionalities. For example, these associations can include amounts of interactions a user has had with content or coaches relating to the dimensions, where the content and/or coaching is determined to have various tags. Additional details regarding applying dimension tags and selecting pulse categories are provided below in relation to FIG. 6.

Some of the virtual platform coaching embodiments include implementations of a motivational matrix. The virtual coaching platform can assess the user in a readiness versus clarity for coaching goals domain. Based on the quadrant of the domain that the user falls into, the user can be mapped to a type. The user's type can be used to select areas to work on, suggested resources, coaching strategies, etc. Additional details regarding applying a motivational matrix are provided below in relation to FIG. 7.

Some of the virtual platform coaching embodiments include additional features such as a resource manager, communications manager, and others. A resource manager can include resources such as exercises, training materials, videos, etc. to be provided to a user. Resources can be organized by skill that the particular resource helps to develop. As users interact with and complete tasks, the resource manager can track user progress. Resources in the resource manager, can be tagged with one or more whole-person dimensionalities, e.g. by manual tagging, using natural language processing (NLP) to automatically assign tags or to recommend tags. In some implementations, coaches can develop custom resources for users, which they can tag. The custom resources can be tagged based on dimensionalities in which the user for which the resource is created has been working. A communications manager can provide various channels for users and coaches to communicate, such as by video chat, IM or text messaging, audio, through guided exercises, etc.

While current coaching providers do not have the insight necessary into their coaches and customers to provide adequate support for the customers or coaching guidance for the coaches, the virtual coaching platform eliminates these problem by implementing specific rules to match coaches with users and to analyze user skills. Furthermore, the virtual coaching system provides an improvement in virtual coaching by providing guidance to coaches, such as how to interact with users and resources to suggest, all based on user-specific analysis in a whole-person model and motivational matrix. In addition, by intelligently selecting when and which skill level scores to update (or "pulse" as discussed below), these benefits are realized with less intrusion and in a less time-consuming manner than in other coaching systems.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that implement a virtual coaching platform. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, virtual coaching platform 164, and other application programs 166. Memory 150 can also include data memory 170 which can be provided to the program memory 160 or any element of the device 100. Memory 170 can include a variety of virtual coaching platform data, such as user and coach style and interest factor values, coach availability and capacity data, user whole-person metrics, measures of user interaction with virtual coaching platform items, virtual coaching platform item metadata such as whole-person model tags, virtual coaching platform resources such as videos, exercises, recordings, reading materials, etc., transcripts of communications between users and coaches, responses to readiness and clarity questions, coaching suggestions, configuration data, settings, user options or preferences, etc.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
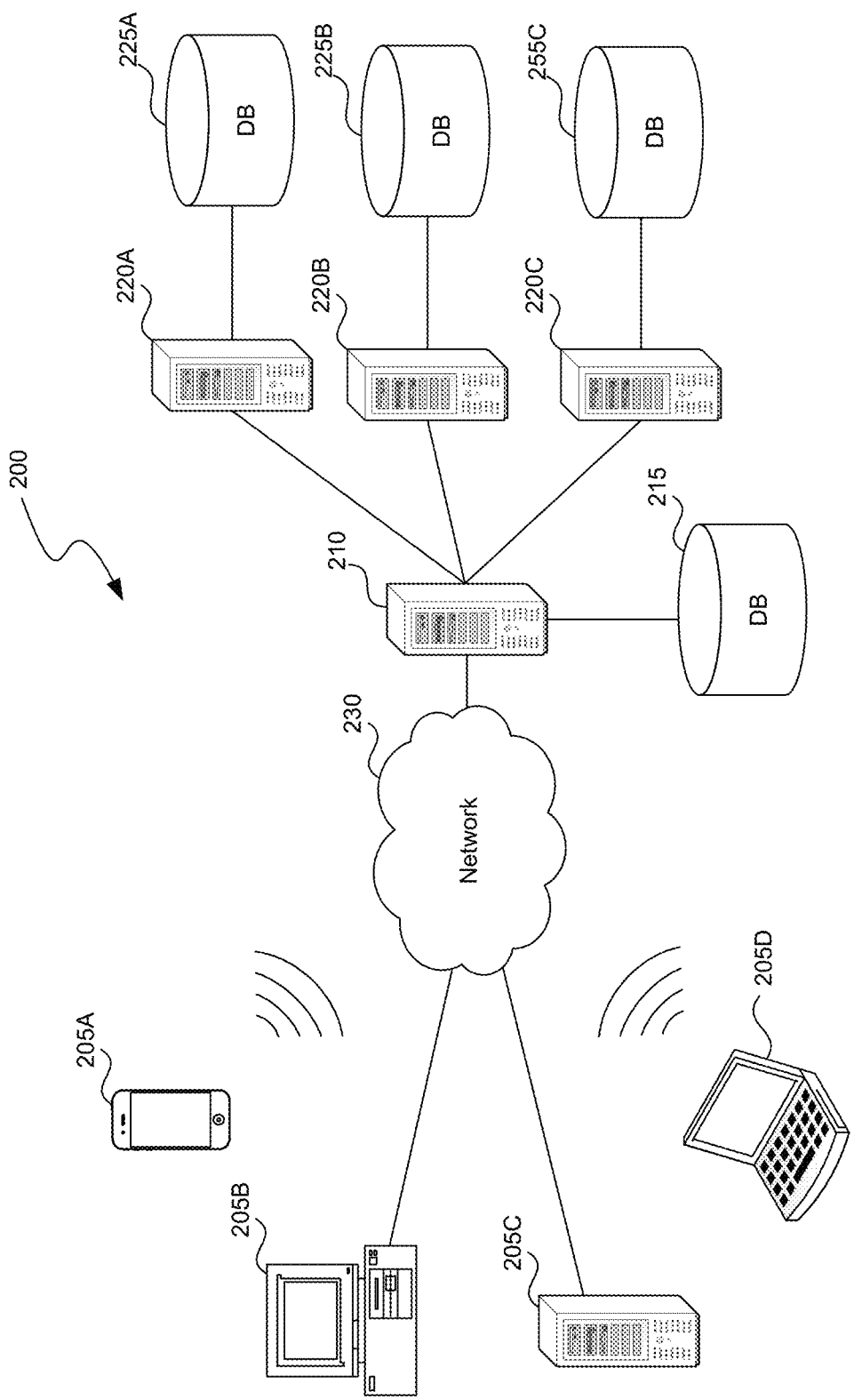
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
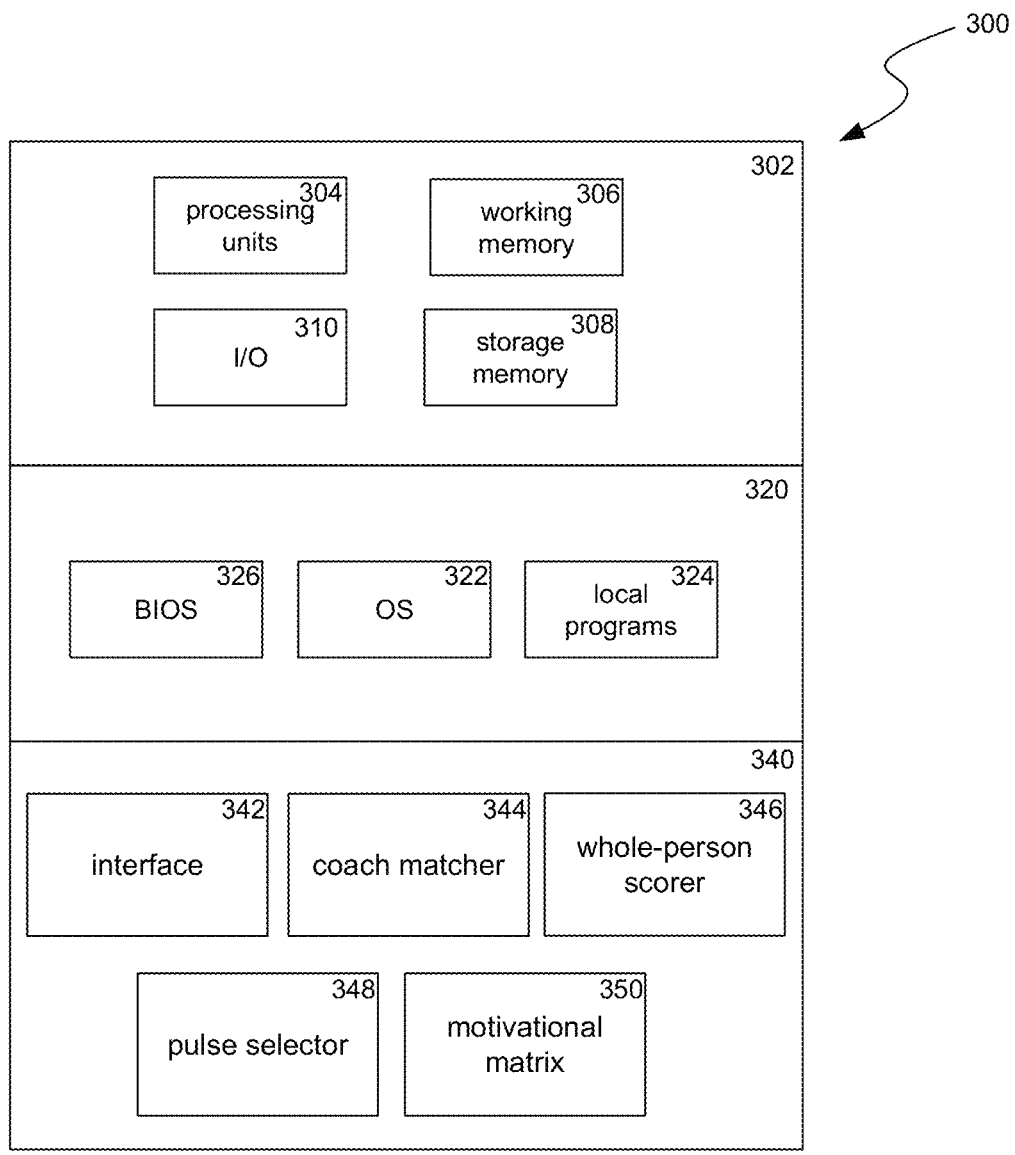
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include coach matcher 344, whole-person scorer 346, pulse selector 348, motivational matrix 350, and components which can be used for providing user interfaces, transferring data, and controlling the specialized components, such as interface 342. The virtual coaching platform can include many additional modules such as a resource manager or a communications manager, discussed below. In some implementations, components 300 can be in a computing system that is distributed across multiple computing devices or can be an interface to a server-based application executing one or more of specialized components 340.

Coach matcher 344 can obtain a set of coaching factors and user factors, e.g. through interface 342. These factors can be various values such as question responses, peer reviews, values assigned to certain experiences or achievements, etc., that are mapped to coaching style or interest categories. Coach matcher 344 can determine a value for each user and coach in each of the style and interest factor types. A compatibility score can be computed between the user and various of the coaches that have sufficient capacity. Coaches can be suggested to the user based on the compatibility score and the coaches' availability. Additional details regarding matching a user to one or more coaches are provided below in relation to FIG. 4.

Whole-person scorer 346 can compute scores for a user in each dimensionality of a whole-person model. Whole-person scorer 346 can accomplish this by obtaining, through interface 342, metrics for each sub-dimension and compute a combined user score for that sub-dimension. Whole-person scorer 346 can then compare that user score for the sub-dimension to a base score, e.g. national average, for the sub-dimension, using a standard deviation of the scores that created the base score. Whole-person scorer 346 can generate a score for each dimension by combining the sub-dimension user scores and then performing similar comparisons to a dimension base score. Additional details regarding generating scores for a user in dimensionalities of a whole-person model are provided below in relation to FIG. 5.

Pulse selector 348 can determine which whole-person scores for dimensions or sub-dimensions should be updated. Pulse selector 348 can accomplish this by analyzing an amount of contact a user has had with virtual coaching platform items (e.g. exercises, coach communications, videos, etc.) that are tagged according to the whole-person model dimensionalities. In some implementations, dimensionalities can have weighted relationships between them such that a user's interaction with an item tagged in one dimensionality can also count as contact with items in another dimensionality, where the amount of contact can be based on the weight defined for the relationship. Dimensionalities with a score above a corresponding threshold can be selected for updating. Scores for dimensionalities selected by pulse selector 348 can be updated, e.g. by whole-person scorer 346. Additional details regarding selecting whole-person dimensionalities to update with a pulse are provided below in relation to FIG. 6.

Motivational matrix 350 can provide coaching suggestions based on user types. Motivational matrix 350 can receive user questions answers associated with values in a readiness/clarity domain. Based on the value, motivational matrix 350 can determine a location within the domain for the user. The domain can be divided into quadrants, each corresponding to a user type and the user can be assigned a type according to which quadrant their corresponding location falls in. Coaching suggestions can be provided to the user's coach depending on the user type. For example, the coaching suggestions can provide recommendations on how to approach the user, recommendations on which resources to suggest to the user, and recommendations as to things to avoid when interacting with the user. Additional details regarding implementing a motivational matrix are provided below in relation to FIG. 7.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
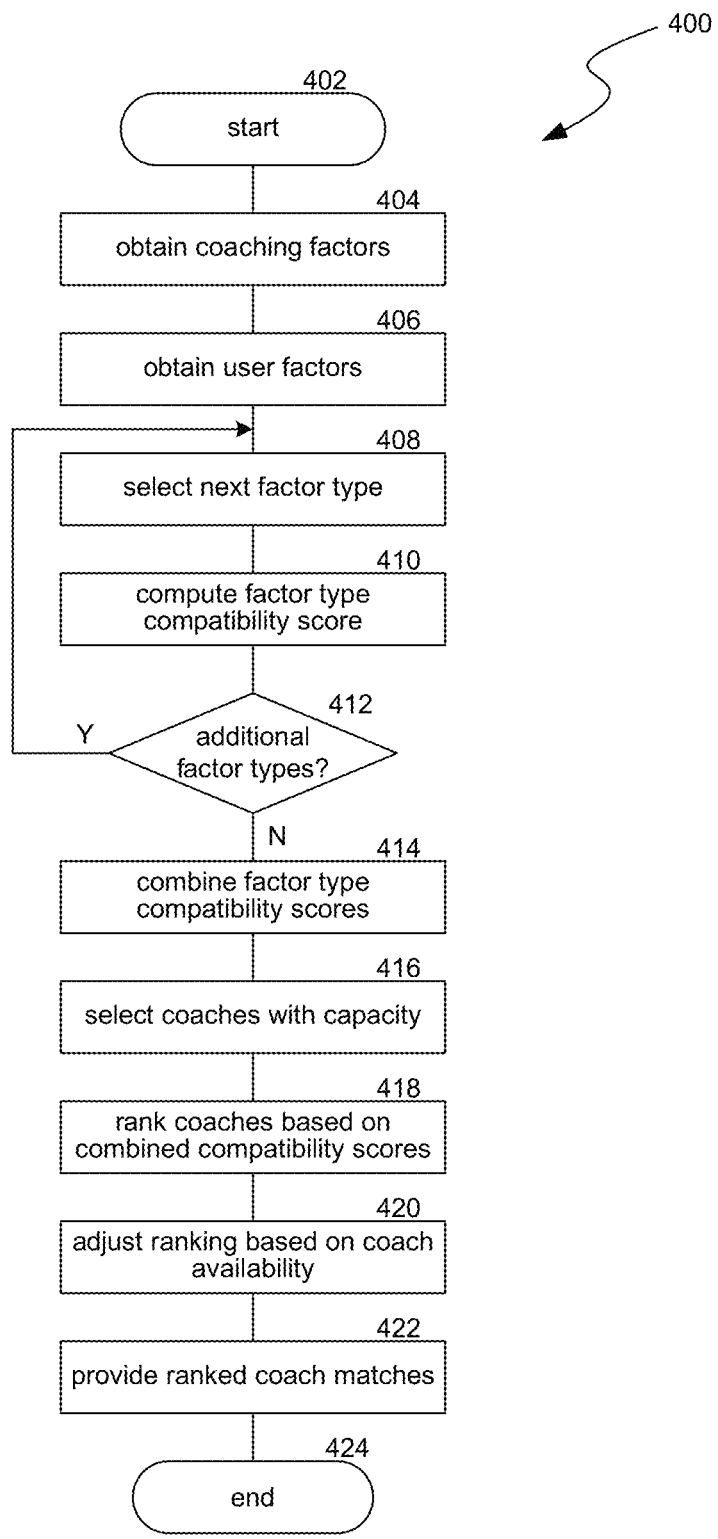
FIG. 4 is a flow diagram illustrating a process used in some implementations for analyzing characteristics of coaches and users to provide suggestions for effective coaching partnerships.

FIG. 4 is a flow diagram illustrating a process 400 used in some implementations for analyzing characteristics of coaches and users to provide suggestions for effective coaching partnerships. In some implementations, process 400 can be implemented when a user joins a virtual coaching platform and needs to be matched with a coach. Process 400 can also be performed if a selected coach becomes unavailable or the user wants a different coach. Process 400 begins at block 402 and continues to block 404. At block 404, process 400 can obtain a set of factors for coaches that are part of the virtual coaching platform. In some implementations, the factors can be obtained for a limited set of the virtual coaching platform coaches, such as those that have available capacity, those that have certain required qualifications (e.g. a minimum number of coaching hours, a particular degree, experience in a particular field or role, etc.), those that have been allocated to a group of people (e.g. a group of coaches for all users who join the virtual coaching platform from a particular company), those that have a specialty matching the user (e.g. a required interest or position), or those that have a specified behavior assessment.

In some implementations, the obtained factors can gauge preferred coaching styles and coaching interests. Coaching style factors can be organized into types, such as autonomy; accountability; directness; and explorativeness. Autonomy can gauge how hands-on a coach is. Accountability can gauge how frequently coaches provide check-ins, messaging, and reminders. Directness can gauge to what degree coaches work in structured, step-by-step manner. Explorativeness can gauge how much a coach focuses on an open and discovery-oriented process. Coaching interest factors can also be organized into types, such as improving focus, improving inspiration, improving stress management, increasing team impact, becoming more open, and communicating with more poise.

The set of factors for each coach can be obtained from a variety of sources such as the coach responding to a series of questions, each configured to provide a value for a factor type; peer reviews or user feedback regarding a coach the user has had, which can take the form of rankings in categories corresponding to the factor types; or mappings between experiences or qualifications and factor values. Process 400 can combine all the factors received for a particular coach into a value for that factor type. For example, where the factors are a set of Likert values corresponding to a set of questions, each with a correspondence to factor type, an overall Likert score can be computed for all the questions that correspond to the same factor type. This overall score can be the value used for that coach for that factor type.

In some implementations, these scores can be stored for coaches so they can be re-used in future iterations of process 400 without having to be recomputed. In addition, these scores can be updated, e.g. periodically or in response to new information, such as a new user review or coach's achievement.

At block 406, process 400 can obtain a set of factors for a user of the virtual coaching platform. The user factors can be of the same type as the coach factors. In some implementations, the process for obtaining the user factor values can be the same as the process used for coaches, e.g. the same questions can be answered by the user or the same mapping to factor values can be used. In some implementations, while the same factor types are valued, the process to obtain these values is different. For example, the questions used to obtain Likert values for coaches can be geared to coaching style while the questions for users can be geared to learning styles. Once the user factor values are obtained, they can be combined in a manner similar to that performed for the coach factors.

At block 408, process 400 can set a next factor type, of the set of factor types, as a selected factor type to be used in the loop between blocks 408-412. When this is the first iteration of this loop, the first factor type can be selected.

At block 410, process 400 can compute a factor type compatibility score indicating a level of compatibility between the user and the coach in the selected factor type. In some implementations, the factor type compatibility score is computed by multiplying the user's combined score for that factor type with the coach's combined score for that factor type, and dividing the product by the maximum possible score for that factor type. For example, if the factor type is directness, which could have a maximum score of 5, the user's directness score is a 3.4, and the coaches directness score is 4.1, the compatibility score for the directness factor could be 3.4*4.1/5=2.79. In some implementations, the maximum score is consistent across all factor types while in other implementations different factor types have different maximum scores. A higher maximum score will generally weight a factor type as more important, i.e. the compatibility score for that factor will generally be higher than compatibility scores with a lower possible maximum. At block 412, process 400 can determine whether there are additional factor types to compute a compatibility score for in the loop between blocks 408-412. If so, process 400 returns to block 408. If not, process 400 continues to block 414.

At block 414, process 400 can combine the factor type compatibility scores computed at block 410. For example, process 400 can compute the sum of the compatibility scores, the average, etc.

At block 416, process 400 can select coaches with a minimum amount of capacity. For example, each coach can have a maximum number of users that they coach, which can be set for individual coaches or for coaches generally. In some implementations, capacity can be based on other factors such as number of hours each user is expected to require from a coach, guarantees of availability to a coach's users, a coach's users' factor scores or types the coach's users fall into (e.g. users with a high autonomy may take up less of a coaches capacity), etc. In some implementations, instead of excluding coaches with below a minimum amount of capacity at block 416, this can occur as part of block 404 where coaching factors are obtained for only coaches with the minimum amount of available capacity.

At block 418, process 400 can rank the coaches according to their compatibility scores with the user. At block 420, process 400 can determine each coach's availability, and adjust their ranking accordingly. In some implementations, availability can be a binary determination for whether the coach has a certain amount of available open timeslots within a given amount of time. More specifically, availability can be true where a coach has at least one 45 minute time slot available within the next five business days. In various implementations, whether a coach has availability can cause an adjustment to the compatibility score (e.g. multiplying it by ⅓, when the coach does not have availability), or can be a sorting factor (e.g. all coaches with availability are sorted above all coaches without availability, which are then sorted by compatibility score). In some implementations, availability can be a scaling factor, e.g. the compatibility score between a coach and the user is adjusted on a scale based on the coach's availability. In some cases, any amount of availability above a particular threshold can have the same adjustment score, e.g. 100%. Prioritizing coaches with a higher amount of immediate availability can incentivize the user to schedule an initial session as soon as possible. In some implementations, coach availability is determined based on a calendar system of the virtual coaching platform, or based on an integration with a separate calendar (e.g. Google Calendar™) such as through an API. In some implementations, correspondence between a user and a coach time zone can be taken into account, to ensure that availability is determined based on open timeslots within business hours of the user.

TABLE 1

| | compatibility score | has capacity? | has availability? | Is recommended? |
|---|---|---|---|---|
| Coach A | 10.0 | no | yes | no |
| Coach B | 20.0 | yes | no | yes (position 3) |
| Coach C | 10.0 | yes | yes | yes (position 2) |
| Coach D | 15.0 | yes | yes | yes (position 1) |

Table 1 shows a list of four coaches, whether each is included in the list of recommended coaches based on their capacity, their compatibility score to a particular user, whether the coach has availability, and the coach's position in the ranking based on the compatibility score and availability.

At block 422, process 400 can provide ranked coaching matches. In various implementations, the provided coach matches can be a top number (e.g. top three) or to percentage (e.g. top 10%) of the match coaches or can be the coaches that have a compatibility score above a threshold.

In some implementations, the list of coaches or a template for each individual coach is provided, e.g. using a series of coach profile pages, such as are shown in user interfaces 8A and 8B. In some implementations, reasons why a particular coach was matched to a user can be shown. For example, factor types that had a high impact on the compatibility score between that coach the user can be indicated. Alternatively, or in addition, individual factors within one of these factor types, such as question responses, academic degrees, experiences, or other metrics used to determine the factor type compatibility score at block 410, can be indicated to the user.

Where process 400 is used as part of a system to assign a coach to a user, the user can select a coach, from the indicated coaches, to be his or her coach in the virtual coaching platform. In some implementations, the user can request a new coach, which can result in repeating process 400. Once a compatible coach is selected, process 400 continues to block 424, where it ends.

As a user interacts with the virtual coaching platform, the platform can generate various scores representing skill levels for the user. These scores can be organized by various categories, category dimensions, and sub-dimension, i.e. dimensionalities. This structure is referred to herein as the "whole-person model." In an example whole-person model, the scores can be within various categories such as personal and leadership. An example whole-person model can also have various dimensions such as centered, aware, agile, includes, elevates, and drives. The centered dimension can relate to leadership in the face of change and can gauge a user's ability to connect, inspire, make decisions, be empathetic, and create a positive environment. The aware dimension can relate to being focused and present and can gauge a user's ability know oneself, know how to adapt to his or her environment, and know how to direct their energy to maximize productivity and well-being. The agile dimension can relate to facing change and can gauge a user's ability to adjust to the unexpected, continually learn, reassess, regroup, and move forward in the face of setbacks and change. The includes dimension can gauge a user's ability to cultivate a culture of caring, trust, and open communication and create an environment where everyone feels that they can participate, contribute, and do their best work. The elevates dimension can gauge a user's ability to leverage and develop the collective capacity of his or her team, communicate an inspiring vision, and create a work environment of autonomy and recognition. The drives dimension can gauge a user's ability to achieve results, move action forward by making decisions, deliver results, and gain support from others. In some implementations, the whole-person model can have dimensions organized under the categories, such as personal: centered, aware, and agile and leadership: includes, elevates, and drives.

In some implications, various dimensions can have one or more sub-dimensions. For example, a whole-person model can have the dimension/sub-dimension relationships of— centered: purpose, engagement, energy, and calm; aware: focus, flow, values, mindfulness, and emotional regulation; agile: resilience, growth mindset, sense of control, and risk tolerance; includes: open communication, participation, positive relationships, and trust climate; elevates: inspiring, coaching, and recognizing ownership; and drives: alignment, problem-solving, feedback, and influence. Another example of a possible whole-person model is provided below in relation to Table 2.

In some implementations, various aspects of the virtual coaching platform can be tagged according to the whole-person model used in the virtual coaching platform. For example, self-reporting questions to gauge a user's strengths can be tagged with one or more dimensions or sub-dimensions of the whole-person model; exercises or activities included in the virtual coaching platform can be tagged for the dimensionalities of the whole-person model the exercise or activity is designed to promote or assess; or interactions a user takes within the virtual coaching platform can be tagged according to the whole-person model dimensionalities.

Figure 5:
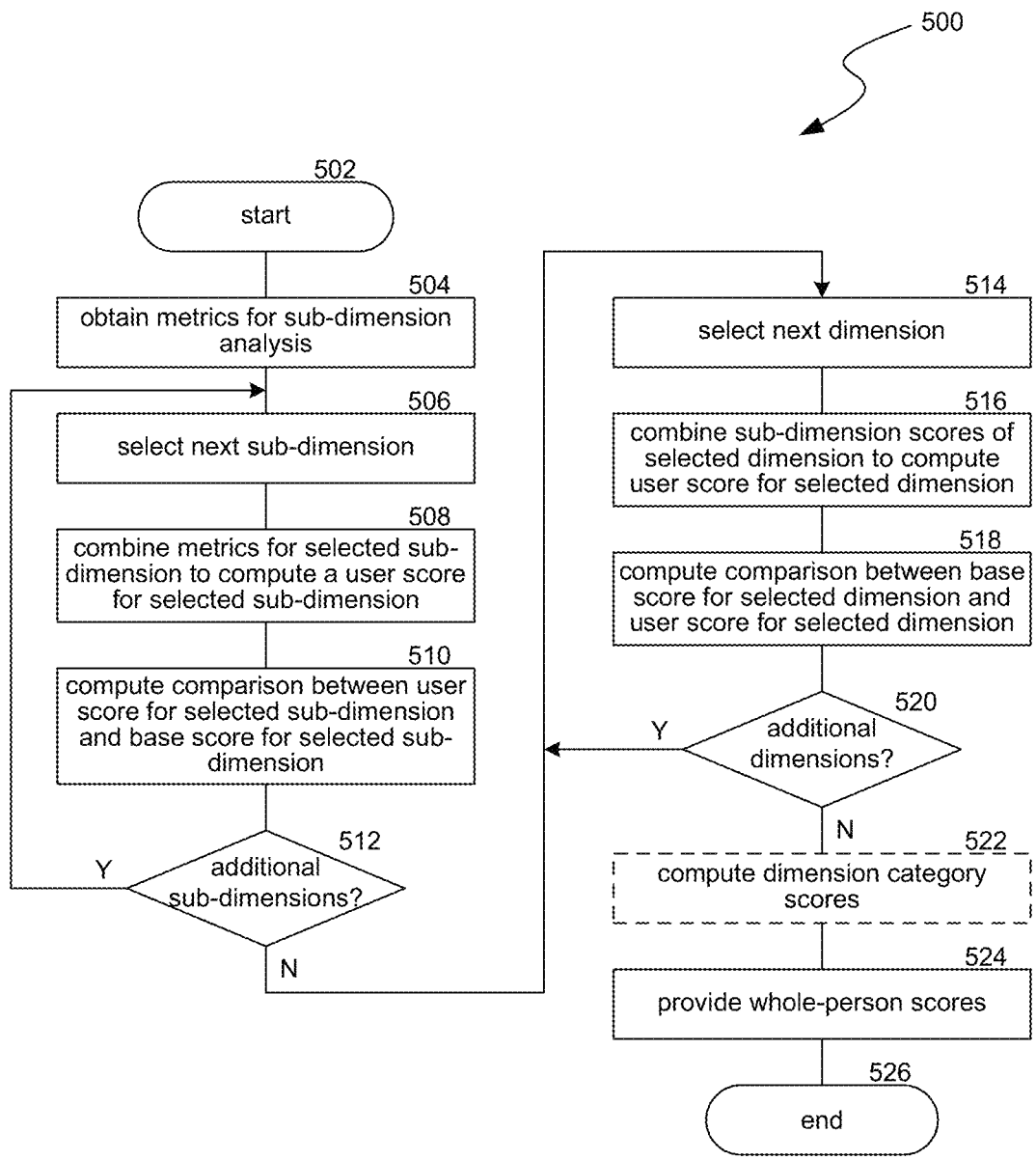
FIG. 5 is a flow diagram illustrating a process used in some implementations for generating scores in multiple whole-person dimensions.

FIG. 5 is a flow diagram illustrating a process 500 used in some implementations for generating scores in multiple whole-person dimensionalities. Process 500 begins at block 502 and continues to block 504. At block 504, process 500 can obtain metrics for analyzing various dimensionalities of the whole-person model of the virtual coaching platform. These metrics can be organized according to the dimension(s) or sub-dimension(s) for which they provide a value. These metrics can be based on a variety of sources such as user responses to questions; peer, supervisor, or supervisee reviews; input from the user's coach; indications of the user's interaction with virtual coaching platform resources or activity scores; NLP of user communications that take place on the virtual coaching platform; etc.

In some implementations, the virtual coaching platform can include multiple questions, each configured to provide insight to the user's strength in one or more of the whole-person model dimensionalities. The questions can be tagged with one or more whole-person model tags corresponding to the dimensionality the question is configured to assess. In some implementations, question responses can be mapped to particular values, e.g. on a Likert scale. In various implementations, such questions can be answered by the user as part of a self-reporting process or through reviews by peers, supervisors, or supervisees of the user. As the user interacts with a coach of the virtual coaching platform, the coach can become familiar with the user's strengths and weaknesses in areas defined by the whole-person model dimensionalities. In various implementations, the coach can provide metrics for the user, either by directly scoring the user in dimensionalities or by answering dimensionality tagged questions about the user, similar to the peer review process. In some implementations, user interactions with the virtual coaching platform can provide dimension or sub-dimension metrics. For example, a user can receive a metric based on individual resources or an amount of resources the user accesses for particular whole-person model dimensionalities. As another example, the user can perform exercises provided through the virtual coaching platform which can tagged via the whole-person model and exercise actions or results can be translated into metrics. As yet a further example, the user's progress through "tracks" corresponding to various whole-person model dimensionalities can be a metric. In some implementations, communications that the user performs through the virtual coaching platform can be valued, e.g. manually by a coach that was part of the communication or through NLP of the communication, such as by a machine learning engine trained based on communications of other users who have established scores in various of the whole-person model dimensionalities.

At block 506, process 500 can select a next sub-dimension as a selected sub-dimension to be operated on by the loop between blocks 506-512. For example, the whole-person model used by the virtual coaching platform can have six dimensions divided into 25 sub-dimensions. The first time process 500 reaches block 506, it can set the first of the sub-dimensions as the selected sub-dimension. Then, in each iteration of the loop between blocks 506-512, block 506 can set a next of the sub-dimensions as the selected sub-dimension.

At block 508, process 500 can combine the metrics, obtained at block 504 for the selected sub-dimension, to compute a user score for the selected sub-dimension. For example, this can be done by taking the average or sum of the metrics for the selected sub-dimension. In some implementations, particular metrics can be weighted before being combined. For example, self-reporting question responses and coaching reviews can be highly weighted (e.g. 100%), reviews by others can be moderately weighted (e.g. 75%), user interactions with the virtual coaching platform can be less weighted (e.g. 50%) and scores from communication observations can be lowly weighted (e.g. 10%). Example results for combining metrics for the selected sub-dimension into a sub-dimension user scores are provided below in the "user sub score" column of Table 2.

At block 510, process 500 can compute a comparison value between the user score for the selected sub-dimension and a base score for the selected sub-dimension. The base scores can be determined based on an average of user scores for the selected sub-dimension for a group of users, such as all users of the virtual coaching platform, users within the same region as the user for which process 500 is being performed, or users within a same category (e.g. based on demographic or biographic information, career role or type, experience level, etc.) as this user. In some implementations, the comparison at block 510 can be performed based on a difference between the sub-dimensions base score and the user score in that sub-dimensions, e.g. by comparing that difference to the total possible score in the sub-dimension. In some implementations, the comparison can be performed using a standard deviation in the scores from the group of users that were used to determine the base score for that sub-dimension. For example, the comparison can implement one or the "normdist" or "norm.dist" function, which provide the normal distribution for a specified mean and standard deviation. For example, in the version of norm.dist provided by Microsoft Office™, the comparison can be performed by the function call norm.dist(user_sub_score, sub_base_score, base_std_div, true). The result of the comparison can be a percentile value. Table 2 shows example results of this comparison in the "sub %" column. In some implementations, this percentile can be multiplied by a constant, e.g. 60, to place the sub-dimension comparison score in the selected sub-dimension on a particular scale, e.g. 1 to 60.

At block 512, process 500 can determine whether there are additional sub-dimensions which need to be analyzed by the loop between blocks 506-512. If so, process 500 returns to block 506. If not, process 500 continues to block 514.

At block 514, process 500 can select a next dimension as a selected dimension to be operated on by the loop between blocks 514-520. For example, the whole-person model used by the virtual coaching platform can have six dimensions. The first time process 500 reaches block 514, it can set the first of the dimensions as a selected dimension. Then, in each iteration of the loop between blocks 514-520, block 514 can set a next of the dimensions as the selected dimension.

At block 516, process 500 can combine the sub-dimensions scores of the selected dimension to compute a user score for the selected dimension. In some implementations, this is done by taking an average of the user sub-dimension scores for the sub-dimensions that make up the selected dimension. Example result of this combination are provided in the "User Dim. Score" column of Table 2.

At block 518, process 500 can compute a comparison value between the user score for the selected dimension and a base score for the selected dimension. Similarly to the base scores for the sub-dimensions, dimension base scores can be based on a combined score for a particular group of users. Similarly to the comparisons for the sub-dimensions, the comparison score for the selected dimension can be determined by comparing the combined user dimension score from block 516 to the dimension base score. This comparison to generate a dimension score can be performed in a manner similar to the comparison of sub-dimensions user scores to sub-dimension base scores, e.g. using the "norm.dist" function. The result of the comparison can be a percentile value. Table 2 shows example results of this comparison in the "Dim. %" column. In some implementations, this percentile can be multiplied by a constant, e.g. 60, to place the user's score in the selected dimension on a particular scale, e.g. 1 to 60.

Figure 8A:
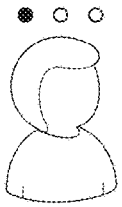
Figure 8B:
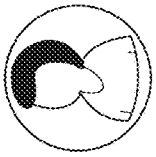

At block 524, process 500 can provide indications of the computed whole-person scores. In some implementations, these indications can be part of a whole-person report, e.g., as shown in FIG. 8C1-8C4. While FIGS. 8C1-8C4 are shown separately, in some implementations these figures can be combined into a single page. For example, a website version of a whole-person report could include each of FIGS. 8C1-8C4 in a single page or could have any of these figures on different pages of the website. In some implementations, various of the whole-person scores can be provided to the user's coach, which can be used for the coach to determine which areas to focus on, or can be compared to various mappings of scores to coaching materials, coaching styles, suggestions, etc. to help the coach determine how to best provide guidance to the user. Process 500 can then continue to block 526, where it ends.

Figure 6:
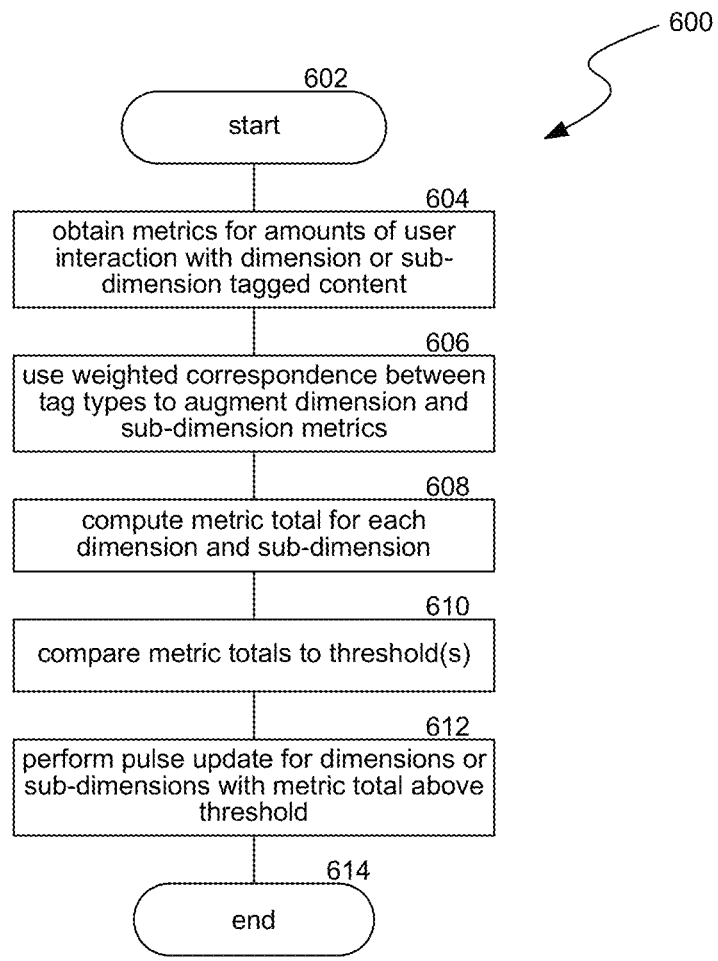
FIG. 6 is a flow diagram illustrating a process used in some implementations for selecting whole-person dimensions to update with a pulse.

FIG. 6 is a flow diagram illustrating a process 600 used in some implementations for selecting whole-person dimensions to update with a pulse. Determining a complete whole-person report, e.g. through process 500, can be

TABLE 2

| Dim. | Sub-Dim. | Sub Base Score | Base Std. Dev. | User Sub Score | Sub % | Dim. Base | Dim. Std. Dev. | User Dim. Score | Dim. % |
|---|---|---|---|---|---|---|---|---|---|
| Centered | Purpose | 3.43 | 1.17 | 4.12 | 0.72 | 3.41 | 1.19 | 3.52 | 0.54 |
|  | Engage | 3.57 | 1.10 | 3.33 | 0.41 |  |  |  |  |
|  | Burnout | 3.36 | 1.26 | 3.89 | 0.66 |  |  |  |  |
|  | Stress | 3.30 | 1.22 | 2.75 | 0.33 |  |  |  |  |
| Aware | Focus | 3.60 | 0.93 | 2.23 | 0.07 | 3.57 | 0.95 | 3.25 | 0.37 |
|  | Flow | 3.21 | 1.02 | 4.05 | 0.79 |  |  |  |  |
|  | Values | 4.31 | 0.67 | 3.54 | 0.13 |  |  |  |  |
|  | Mindfulness | 3.12 | 1.10 | 3.44 | 0.61 |  |  |  |  |
|  | Emotional Regulation | 3.61 | 1.01 | 2.98 | 0.27 |  |  |  |  |
| Agile | Resilience | 3.58 | 0.94 | 4.55 | 0.85 | 3.91 | 0.81 | 3.78 | 0.43 |
|  | Growth Mindset | 3.92 | 0.85 | 3.45 | 0.29 |  |  |  |  |
|  | Efficacy | 3.87 | 0.82 | 3.21 | 0.21 |  |  |  |  |
|  | Risk Tolerance | 4.28 | 0.64 | 3.89 | 0.27 |  |  |  |  |
| Includes | Open Communication | 3.90 | 0.76 | 4.76 | 0.87 | 3.87 | 0.81 | 4.43 | 0.75 |
|  | Participation | 3.82 | 0.80 | 4.52 | 0.81 |  |  |  |  |
|  | Relationship Building | 3.83 | 0.88 | 4.32 | 0.71 |  |  |  |  |
|  | Trust Climate | 3.94 | 0.79 | 4.11 | 0.58 |  |  |  |  |
| Elevates | Inspire | 3.54 | 0.99 | 3.76 | 0.59 | 3.79 | 0.86 | 3.80 | 0.50 |
|  | Coach | 3.50 | 0.95 | 2.98 | 0.29 |  |  |  |  |
|  | Recognition | 4.19 | 0.70 | 4.67 | 0.75 |  |  |  |  |
|  | Ownership | 3.90 | 0.80 | 3.79 | 0.44 |  |  |  |  |
| Drives | Alignment | 3.96 | 0.80 | 4.23 | 0.63 | 3.94 | 0.76 | 4.14 | 0.61 |
|  | Problem Solving | 3.83 | 0.83 | 4.65 | 0.84 |  |  |  |  |
|  | Feedback | 3.94 | 0.75 | 3.66 | 0.36 |  |  |  |  |
|  | Influence | 4.04 | 0.67 | 4.03 | 0.50 |  |  |  |  |

At block 520, process 500 can determine whether there are additional dimensions, of the dimensions of the whole-person model, to be scored in the loop between blocks 514-520. If so, process 400 returns to block 514. If not, process 500 continues to block 522.

At block 522, process 500 can determine a score for each of the categories that the dimensions are in. Block 522 is shown in dashed lines, indicating it is a step not performed in some implementations. In some implementations, process 500 can compute the dimension category score by taking an average of the scores for the dimensions that make up the category. In some implementations, process 500 can compute the dimension category score based on the dimension scores, in a manner similar to the computation of the dimension scores based on the sub-dimensions scores.

resource intensive or time-consuming. For example, obtaining the metrics needed to generate all the sub-dimensions scores can require the user, peers, supervisors, a coach, or others to answer a multitude of questions. While the entirety of process 500 may be beneficial to perform in certain instances, such as when a user first joins the virtual coaching platform, it can also be beneficial to update only a subset of dimensionality scores in particular instances. For example, a subset of the dimensionality scores can be updated periodically (e.g., every set number of days weeks or months) or when certain milestones are reached (e.g. when particular tasks are completed, upon recommendation by a coach, upon the user interacting with the virtual coaching platform for a certain amount of time, etc.). The updating process is referred to herein as a "pulse," and entails performing process 500 using only a subset of the whole-person model dimensions or sub-dimensions. When a pulse version of process 500 occurs, the base scores used at blocks 510 and 518 can be determined using scores of users recorded for a corresponding time period or milestone. For example, if this is a pulse update for the 90 day from joining mark, base scores can be for other users who were at the same 90 period.

Which dimensionalities to pulse are selected using process 600. For example, process 600 can select dimensionalities to pulse based on a determination of what has been a focus of the user's recent (e.g. since the last pulse) coaching experiences. Process 600 begins at block 602 and continues to block 604. At block 604, process 600 can obtain metrics for amounts of user interaction the user has had with content tagged for a dimensionality of the whole-person model. The metrics can indicate items, tagged with a particular dimensionality, the user has interacted with or can be an amount of time the user has interacted with such resources. In some implementations, these items can include virtual coaching platform resources and activities. In some implementations, these items can also include conversations or other interactions with the user's coach or with other users. These conversations can be tagged according to the whole-person model, either manually by a coach that took part in the conversation, or through the use of NLP analysis. Such NLP analysis can be performed, for example, using a trained classification engine that used manually tagged conversations as training data to select which tags should be applied to additional conversations.

At block 606, process 600 can use determined weighted correspondences between the dimensions or sub-dimensions of the whole-person model to augment the metrics obtained at block 604. These relationships can signify a determination that work in a particular dimensionality can also provide a benefit in another dimension or sub-dimension. For example, there can be parent/child relationships between dimensions and sub-dimensions, where the weight of the relationship is a measure of the significance of the sub-dimension to the parent dimension. For example, a particular sub-dimension can be determined to be 25% of the significance of its parent dimension, and thus can have a 0.25 weighting factor. In some implementations, these relationships can be associative, indicating that a first amount of work on a particular dimensionality is equivalent to a second amount of work in an associated dimensionality. For example, an associative relationship can specify that one hour working in an engagement sub-dimension also qualifies as 12 minutes working in an energy sub-dimension. In this example, there would be a 0.2 weighting factor on an engagement to energy sub-dimension relationship.

Based on the specified dimensionality relationships, a metric for a particular sub-dimension can cause an addition to the set of metrics for another dimension or sub-dimension by an amount specified by the relationship weighting factor. For example, where one metric is five hours of work in an open communication sub-domain, and where the open communication sub-dimension has a relationship with the trust climate sub-dimension with a weighting factor of 0.35, an additional trust climate metric can be added in an amount of 0.35*5=1.75 hours. In some implementations, the updating between dimensionalities at block 616 can be limited to one hop between dimensionalities or can cascade based on all relationships between dimensionalities. In some implementations, relationships can be circular, i.e. sub-dimension A can have a relationship with sub-dimension B, which can have a relationship with sub-dimension C, which can have a relationship with sub-dimension A. In some implementations, cascading updates can be limited to prevent adding a dimensionality type of the type that initiated the update.

At block 608, process 600 can compute a metric total for each dimensionality. This can be accomplished, for example, by taking, for each dimensionality, a sum or average of the corresponding metrics obtained at block 604, as updated at block 606.

At block 610, process 600 can compare the metric total of each dimensionality against one or more thresholds. In various implementations, the thresholds can be specific to each dimension or sub-dimension, there can be a first threshold for dimensions and a second threshold for sub-dimensions, or a single threshold can be used for the comparison across all dimensionalities.

At block 612, process 600 can perform a pulse update for dimensionalities that have a metric total above the corresponding threshold. The pulse update or updates can include performing process 500 using only the whole-person model dimensionalities selected at block 610. For example, the user can be asked to respond to only the subset of self-reporting questions that are tagged with the selected dimensionality.

The virtual coaching platform can track a user's score in each dimension or sub-dimension. As the pulse updates occur, each dimensionality score can be updated accordingly. When a pulse update occurs, a new whole-person report or the updated score(s) can be provided to the user. In some implementations, an indication can be provided in a report to show which scores have been updated since the last whole-person report, timestamps can be provided for each of the dimensionality scores, dimensionalities can be marked to indicate suggested areas of work, etc. Once the pulse updates have occurred, process 600 continues to block 614, where it ends.

Figure 7:
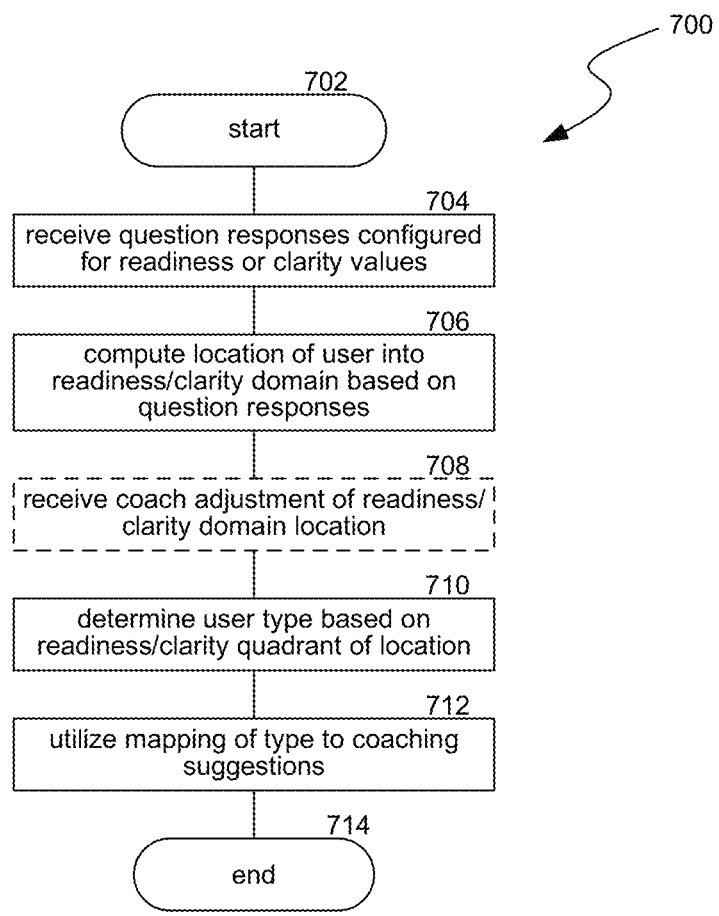
FIG. 7 is a flow diagram illustrating a process used in some implementations for implementing a motivational matrix.

FIG. 7 is a flow diagram illustrating a process 700 used in some implementations for implementing a motivational matrix.

A motivational matrix can be another tool of the virtual coaching platform that provides guidance for coaches on how to interact with the user based on one of four types, selected based on the user's readiness for coaching or clarity of coaching goals. Process 700 begins at block 702 and continues to block 704.

At block 704, process 700 can receive question responses, each configured to provide a "readiness for coaching" or "clarity of coaching goals" value for a user. For example, a list of questions can include: When engaging with a coach I prefer a style that offers: <options>; When working towards goals, I prefer a style that is: <options>; Improve focus <value>; Inspire my team <value>; Handle stress better <value>; Increase my impact <value>; Become more open <value>; Communicate with poise <value>; Right now is a good time for me to begin working with a coach <value>; I have a clear understanding of what I would like to work on with my coach <value>; I am open to investing in my personal development right now <value>; I believe I can achieve meaningful change or growth by working with a coach <value>; How satisfied have you been with your level of physical fitness?<value>; How satisfied have you been with your physical health?<value>; How satisfied have you been with your diet?<value>; How satisfied have you been with how much energy you have throughout the day?<value>; How satisfied have you been with how much you get each night?<value>; How satisfied have you been with your friendships?<value>; How satisfied have you been with your family life?<value>; How satisfied have you been with your relationships at work? <value>; How satisfied have you been with your leisure time?<value>; How satisfied have you been with your romantic relationship(s) ?<value>. Each question can have a corresponding set of possible responses, values, or scores, selectable by the user.

At block 706, process 700 can compute a location of a user into a readiness/clarity domain, based on the received question responses. For example, each possible question responses can be associated with a positive or negative value in one or both of the readiness or clarity dimensions. The sum of the values in each dimension can determine a location of the user in the readiness/clarity domain.

At block 708, process 700 can receive an adjustment, from the user's coach, of the readiness/clarity domain location determined at block 706. As indicated by the dashed line, in some cases no adjustment is made from a coach. In some implementations, the adjustment can be made by providing the user's automatic clarity or readiness scores, or location in the readiness/clarity domain, to the coach, and having the coach edit them directly. In some implementations, the adjustment can be made by having the coach answer additional questions, such as the questions described above, in relation to their impression of the user, and adjusting the user's readiness and clarity scores accordingly. In various implementations, coaches answers can be unweighted or weighted more or less than the user's responses.

At block 710, process 700 can determine a type for the user based on the quadrant of the readiness/clarity domain the user's location falls in. In some implementations, the quadrants can correspond to a finding type, a focus type, a nurture type, and a prove type. The finding type can be for users with low clarity and high readiness, the focus type can be for users with high clarity and high readiness, the nurture type can be for users with low clarity and low readiness, and the prove type can be for users with high clarity and low readiness.

At block 712, process 700 can utilize a mapping of type to coaching suggestions to provide guidance to a coach. For example, the coaching suggestions can provide recommendations on how to approach the user, recommendations on which resources to suggest to the user, and recommendations as to things to avoid when interacting with the user. An example of coaching suggestions for the "Find" type are provided below in relation to FIG. 8D. Process 700 can then continue to block 714, where it ends.

An additional feature of the virtual coaching platform can include a resource manager providing access to a variety of resources. Resources can include, for example, exercises, reading materials, training videos, recordings, or etc. In some implementations, resources can be tagged based on a skill level, e.g., basic, intermediate, or advanced; based on a type of activity, e.g., reading, watching, listening, or doing; and by duration. In some implementations resources can be rated, e.g., based on user or coach feedback.

In some implementations, resources can be created to help users develop in areas corresponding to the dimensionalities of the whole-person model, and can be tagged accordingly. Resources can be tagged according to dimensionalities in various ways, such as manually by coaches or other resource creators or can be tagged through an NLP method where a tagging engine can be trained on previously tagged resources to provide dimensionality tags for new resources.

In some implementations, coaches can create custom resources for a particular user. The coach can tag the resource with various of the possible tags. In some implementations, tags for a new resource can be suggested to the coach, e.g., based on the content of the resource or a dimensionality that the user the resource was created for, has been working in. In some cases, custom resources created by one coach can be available to other coaches to provide to their users as well.

Figure 8E:
Figure 8F:
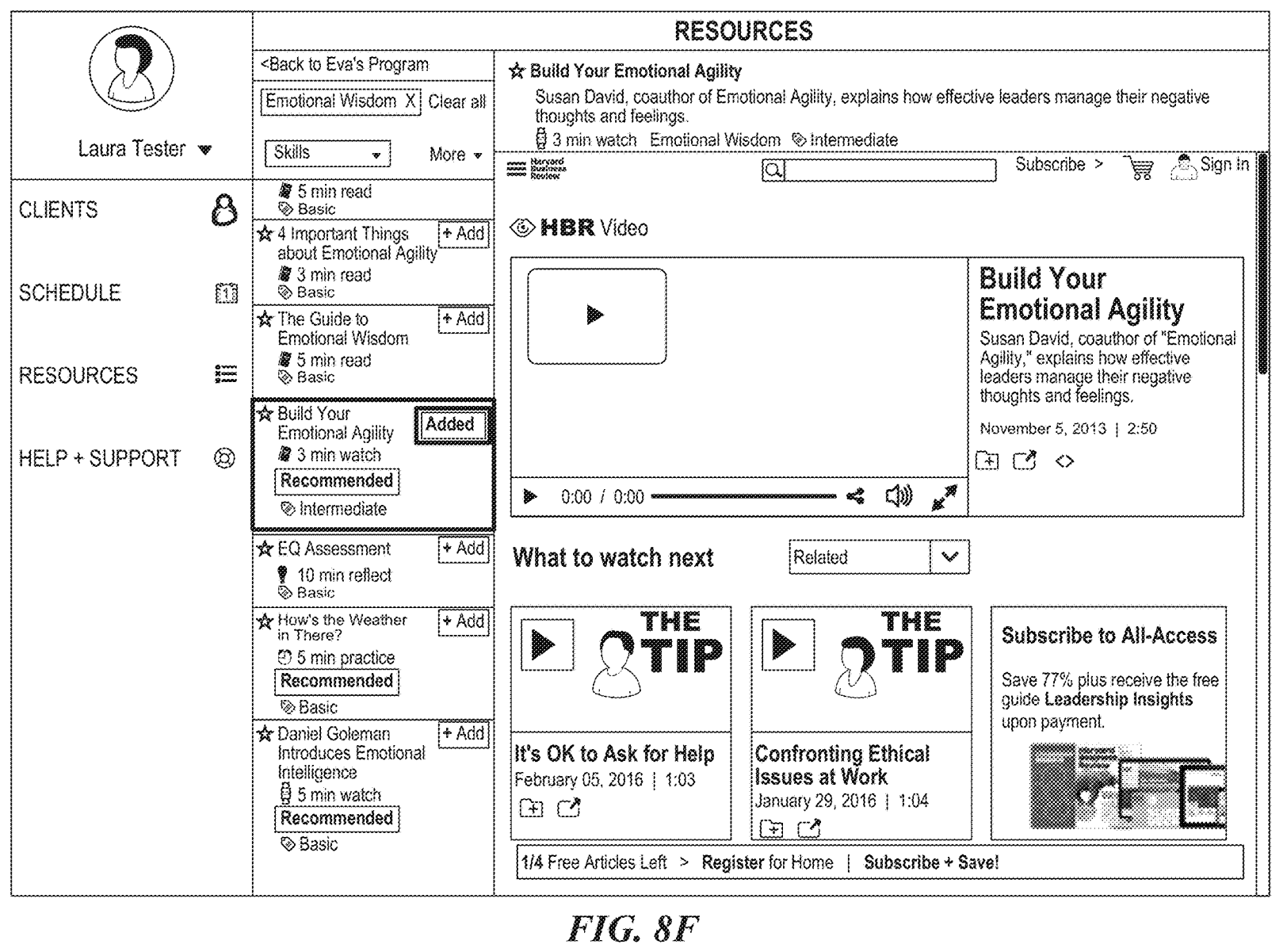

Users or coaches can search for or filter resources from the resource manager based on the various tags. For example, based on a recent pulse update, a coach can determine that a user has not made much progress in and "inspiring" sub-dimension and can select and suggest resources to the user that are tagged with that sub-dimension. In some implementations, the virtual coaching platform can track a user's individual progress through a particular resource or set of resources in the resource manager. A sample user interface is provided in FIG. 8E, showing a track of resources for improving in a "centered leader" dimension, with a list of sub-dimensions (shown as "skills"), and activities in the resource manager to complete for this track. Some additional features of a user interface for interacting with a resource manager are provided in FIG. 8F.

Another feature of the virtual coaching platform can include a communications manager. A communications manager can provide various channels for users and coaches to communicate, such as by video chat, IM or text messaging, audio, through guided exercises, etc. In some implementations, the communications manager can facilitate setting up meetings between a user and a coach, e.g. through a native calendar app or by coordinating between existing calendar apps such as Outlook™ or Google Calendars™. In some implementations, the communications manager can provide reminders to users or coaches about upcoming meetings or to set up a meeting when one has not occurred within a threshold amount of time or on a given meeting schedule. In some implementations, the communications manager can include a "to-do" component, which can include a list of resources, activities, and appointments, etc., that are upcoming for a user. In some implementations, the communications manager can obtain a textual version of communications between users and coaches, and store these transcripts for use in various NLP processes related to coaching of the user. In some implementations, the communications manager can tag communications between the coach and the user with various whole-person model dimensionality tags, e.g. by receiving manual tags from the coach or through an NLP process performed on a stored transcript of the communication. These tags can be used, for example, as part of process 600 for determining which dimensionalities to pulse.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A system implementing a virtual coaching platform, the system comprising:
   one or more processors;
   an interface that obtains dimensionality metrics in relation to a user, wherein each dimensionality metric has an association to at least one dimensionality of at least part of a user skills model,
      wherein the user skills model comprises dimensionalities made up of multiple dimensions and multiple sub-dimensions; and
   a memory storing virtual coaching platform items, the virtual platform items including videos, exercises, recordings, and reading materials, the memory further storing measures of user interaction with virtual platform items, and the memory further storing instructions that, when executed by the one or more processors, cause the sustem to perform operations comprising:
      for each selected sub-dimension, of two or more sub-dimensions of the at least part of the user skills model:
         combining the obtained metrics associated with the selected sub-dimension into a user score for the selected sub-dimension;
         computing a comparison value for the selected sub-dimension by comparing the user score for the selected sub-dimension with a base score for the selected sub-dimension;
         at least in part by accessing, with at least one processor of the one or more processors, at least one of the measures of user interaction with virtual platform items stored in the memory, periodically obtaining a metric for an amount of user interaction the user has had with content tagged for the sub-dimension, wherein the metric indicates items, tagged with the selected sub-dimension, that the user has interacted with or an amount of time the user has interact with such items;
         comparing the obtained metric to a threshold;
         determining whether the obtained metric is above the threshold; and
         in response to determining that the obtained metric is above the threshold,
            updating the selected sub-dimension at least in part by computing scores, for the user, in the selected sub-dimension;
      for each selected dimension, of two or more dimensions of the at least part of the user skills model:
         combining the user scores for the sub-dimensions corresponding to the selected dimension into a user score for the selected dimension; and
         computing a comparison value for the selected dimension by comparing the user score for the selected dimension with a base score for the selected dimension;
      automatically computing a type of the user by:
         obtaining multiple values for the user, each value specifying an amount for at least two axes of a domain;
         combining the amounts for each axis from the multiple values to compute an overall location in the domain for the user; and
         identifying the type of the user previously mapped to the location in the domain; and
      selecting one or more coaching suggestions customized to the user based on the computed type of the user and a mapping of: A) the comparison value for a particular dimension, to B) the one or more coaching suggestions,
- wherein the one or more coaching suggestions are further matched, based on the computed type of the user, with recommendations on how to provide the one or more coaching suggestions to the user or recommendations as to things to avoid when to provide the one or more coaching suggestions to the user, and
- wherein at least some of the selected one or more coaching suggestions are provided to the user.

2. The system of claim 1,
- wherein the base score for a particular sub-dimension, of the two or more sub-dimensions, is an average of user scores for the particular sub-dimension for a group of users within the same geographical region as the user; and
- where computing the comparison value for the particular sub-dimension is based on a standard deviation in the scores for the group of users.

3. The system of claim 1,
- wherein at least some of the obtained metrics are values corresponding to responses, by the user, to a set of self-reporting questions; and
- wherein each of the self-reporting response values has the association to at least one sub-dimension by virtue of being tagged with one or more aspects of the user skills model.

4. The system of claim 1, wherein at least some of the obtained dimensionality metrics are values corresponding to responses, by a second user who the user has identified as a peer, to a set of peer review questions.

5. The system of claim 1,
- wherein the multiple dimensions in the user skills model are equivalent to:
  - centered, aware, agile, including, elevates, and drives;
- wherein the multiple sub-dimensions are organized under the dimensions;
- wherein the sub-dimensions under in the centered dimension are equivalent to:
  - purpose, engagement, energy, and calm;
- wherein the sub-dimensions under in the aware dimension are equivalent to:
  - focus, flow, values, mindfulness, and emotional regulation;
- wherein the sub-dimensions under in the agile dimension are equivalent to:
  - resilience, growth mindset, sense of control, and risk tolerance;
- wherein the sub-dimensions under in the including dimension are equivalent to:
  - open communication, participation, positive relationships, and trust climate;
- wherein the sub-dimensions under in the agile dimension are equivalent to:
  - inspiring, coaching, recognizing, and ownership; and
- wherein the sub-dimensions under in the drives dimension are equivalent to:
  - alignment, problem solving, feedback, and influence.

6. The system of claim 1,
- wherein the multiple dimensions in the user skills model are equivalent to:
  - centered, aware, agile, including, elevates, and drives; and
- wherein the multiple sub-dimensions are organized under the dimensions.

7. The system of claim 1,
- wherein the at least part of a user skills model comprises less than all of the dimensionalities of the user skills model; and
- wherein computing the comparison value for each of the selected sub-dimensions are performed to update a previously determined score for a corresponding sub-dimension.

8. The system of claim 1,
- wherein the at least part of a user skills model comprises less than all of the dimensionalities of the user skills model;
- wherein computing the comparison value for each of the selected sub-dimensions are performed to update a previously determined score for a corresponding sub-dimension; and
- wherein the dimensionalities that are included in the at least part of a user skills model are chosen by:
  - obtaining pulse metrics indicating amounts of interaction the user has had with content tagged with at least one dimensionality of the user skills model; and
  - determining that a total of the pulse metrics corresponding to each of the dimensionalities, that are included in the at least part of a user skills model, exceeds a threshold.

9. The system of claim 1,
- wherein the at least part of a user skills model comprises less than all of the dimensionalities of the user skills model;
- wherein computing the comparison value for each of the selected sub-dimensions are performed to update a previously determined score for a corresponding sub-dimension; and
- wherein at least a first of the dimensionalities that are included in the at least part of a user skills model is chosen by:
  - obtaining pulse metrics indicating amounts of interaction the user has had with content tagged with at least one dimensionality of the user skills model;
  - augmenting the pulse metrics with an additional pulse metric in the first dimensionality by applying a mapping, between a second dimensionality to the first dimensionality, that has a weighting factor, wherein applying the mapping comprises multiplying one of the obtained pulse metrics corresponding to the second dimensionality by the weighting factor;
  - computing a total pulse metric for the first dimensionality by combining at least one of the obtained pulse metrics corresponding to the first dimensionality and the additional pulse metric; and
  - determining that the total pulse metric for the first dimensionality exceeds a threshold.

10. A non-transitory computer-readable storage medium storing instructions that, when executed by a computing system having one or more processors, cause the computing system to perform operations for assessing user competencies in dimensionalities of a user skills model, the operations comprising:
- identifying candidate dimensionalities, from a user skills model, by:
  - automatically analyzing amounts of user interaction with content tagged in relation to one or more sub-dimensions of one or more dimensionalities of the user skills model;
  - applying weights, to the amounts of user interaction for one or more sub-dimensions, to obtain metric scores for the one or more dimensionalities, wherein the weight for a sub-dimension is based on a significance value for that sub-dimension to a corresponding dimensionality; and selecting candidate dimensionalities that have a metric score above a threshold;

obtaining dimensionality metrics for the selected candidate dimensionalities;

for selected sub-dimensions, of two or more sub-dimensions of the selected candidate dimensionalities:

combining the obtained metrics associated with the selected sub-dimension into a user score for the selected sub-dimension;

for selected dimensions, of two or more dimensions of the user skills model:

combining the user scores for the selected sub-dimensions corresponding to the selected dimension into a user score for the selected dimension; and computing a comparison value for the selected dimension by comparing the user score for the selected dimension with a base score for the selected dimension;

automatically computing a type of a user by based on a combination of determined amounts, for the user, in at least two axes of a domain, wherein the combination is mapped to the type;

storing, in a memory, measures of user interaction with virtual platform items;

periodically analyzing an amount of contact that the user has had the virtual platform items based at least in part by accessing, with at least one processor of the one or more processors, at least one of the measures of user interaction with virtual platform items stored in the memory;

based at least in part on the analyzing, updating at least one sub-dimension for the user in response to determining that a metric for the at least one sub-dimension is greater than a threshold;

ranking sub-dimensions based at least in part on the updated at least on dimension;

updating a user interface based on the ranking of the sub-dimensions so that the sub-dimension are placed according to the ranking; and selecting one or more coaching suggestions customized to the user based on the computed type of the user and a mapping of: A) the comparison value for a particular dimension, to B) the one or more coaching suggestions, wherein at least some of the selected one or more coaching suggestions are provided to the user.

11. The computer-readable storage medium of claim 10, wherein at least some of the obtained metrics are values corresponding to responses, by the user, to a set of self-reporting questions; and wherein each of the self-reporting response values has the association to at least one sub-dimension by virtue of being tagged with one or more aspects of the user skills model.

12. The computer-readable storage medium of claim 10, wherein the multiple dimensions in the user skills model are equivalent to:

centered, aware, agile, including, elevates, and drives; and wherein the multiple sub-dimensions are organized under the dimensions.

13. The computer-readable storage medium of claim 10, wherein the sub-dimensions under in the centered dimension are equivalent to:

purpose, engagement, energy, and calm;

wherein the sub-dimensions under in the aware dimension are equivalent to:

focus, flow, values, mindfulness, and emotional regulation;

wherein the sub-dimensions under in the agile dimension are equivalent to:

resilience, growth mindset, sense of control, and risk tolerance;

wherein the sub-dimensions under in the including dimension are equivalent to:

open communication, participation, positive relationships, and trust climate;

wherein the sub-dimensions under in the agile dimension are equivalent to:

inspiring, coaching, recognizing, and ownership; and wherein the sub-dimensions under in the drives dimension are equivalent to:

alignment, problem solving, feedback, and influence.

14. The computer-readable storage medium of claim 10, wherein the at least part of a user skills model comprises less than all of the dimensionalities of the user skills model;

wherein the operations further comprise computing a comparison value for each selected sub-dimension by comparing the user score for the selected sub-dimension with a base score for the selected sub-dimension, wherein computing the comparison value updates a previously determined comparison score for the selected sub-dimension; and wherein the weight for a selected sub-dimension in relation to a first dimensionality is selected from a mapping, between a second dimensionality to the first dimensionality, that has a weighting factor;

wherein applying the weight comprises:

multiplying a metric score corresponding to the second dimensionality by the weighting factor; and computing a total metric score for the first dimensionality by combining results of the multiplication and one or more other metric scores for the first dimensionality;

wherein selecting the candidate dimensionalities includes selecting the first dimensionality based on the total metric score for the first dimensionality exceeding the threshold.

15. A method for assessing user competencies in dimensionalities of a user skills model, the method comprising:

storing, in a memory, measures of user interaction with virtual platform items;

identifying candidate dimensionalities, from a user skills model, by:

automatically determining metric scores for candidate dimensionalities by analyzing amounts of user interaction with content tagged in relation to a one or more sub-dimensions of one or more dimensionalities of the user skills model at least in part by accessing, with at least one processor, at least one of the measures of user interaction with virtual platform items stored in the memory; and selecting candidate dimensionalities that have a metric score above a threshold;

obtaining dimensionality metrics in relation to the selected candidate dimensionalities;

for selected dimensions, of two or more dimensions of the selected candidate dimensionalities:
  combining user scores for the sub-dimensions corresponding to the selected dimension into a user score for the selected dimension; and
  computing a comparison value for the selected dimension by comparing the user score for the selected dimension with a base score for the selected dimension;
periodically analyzing an amount of contact that a user has had with virtual platform items based at least in part by accessing, with at least one processor, at least one of the measures of user interaction with virtual platform items stored in the memory;
based at least in part on the analyzing, updating at least one sub-dimension for the user in response to determining that a metric for the at least one sub-dimension is greater than a threshold; and
selecting one or more coaching suggestions corresponding to the computed comparison values for the dimensions, wherein at least some of the selected one or more coaching suggestions are provided to the user in a coaching session.

16. The method of claim 15 further comprising:
for selected sub-dimensions, of two or more sub-dimensions of the selected candidate dimensionalities:
  combining the obtained metrics associated with the selected sub-dimension into a user score for the selected sub-dimension; and
  computing a comparison value for the selected sub-dimension by comparing the user score for the selected sub-dimension with a base score for the selected sub-dimension; and
providing indications of the computed comparison values for the sub-dimensions.

17. The method of claim 15,
wherein at least some of the obtained metrics are values corresponding to responses, by the user, to a set of self-reporting questions; and
wherein each of the self-reporting response values has the association to at least one sub-dimension by virtue of being tagged with one or more aspects of the user skills model.

18. The method of claim 15,
wherein the multiple dimensions in the user skills model are equivalent to:
  centered, aware, agile, including, elevates, and drives; and
wherein the multiple sub-dimensions are organized under the dimensions.

19. The method of claim 15,
wherein the sub-dimensions under in the centered dimension are equivalent to:
  purpose, engagement, energy, and calm;
wherein the sub-dimensions under in the aware dimension are equivalent to:
  focus, flow, values, mindfulness, and emotional regulation;
wherein the sub-dimensions under in the agile dimension are equivalent to:
  resilience, growth mindset, sense of control, and risk tolerance;
wherein the sub-dimensions under in the including dimension are equivalent to:
  open communication, participation, positive relationships, and trust climate;
wherein the sub-dimensions under in the agile dimension are equivalent to:
  inspiring, coaching, recognizing, and ownership; and
wherein the sub-dimensions under in the drives dimension are equivalent to:
  alignment, problem solving, feedback, and influence.

20. The method of claim 15 further comprising determining the metric scores by applying weights, to the amounts of user interaction for one or more sub-dimensions, wherein the weight for a sub-dimension is based on a significance value for that sub-dimension to a corresponding dimensionality.

* * * * *